April 27, 1954 B. C. HILL 2,677,064

PIEZOELECTRIC CRYSTAL AND HOLDER

Filed Jan. 21, 1950

INVENTOR:
BERTRAM C. HILL
BY
Campbell, Brumbaugh, Free & Graves
HIS ATTORNEYS.

Patented Apr. 27, 1954

2,677,064

UNITED STATES PATENT OFFICE 2,677,064

PIEZOELECTRIC CRYSTAL AND HOLDER

Bertram C. Hill, Carlisle, Pa., assignor to Reeves-Hoffman Corporation, Carlisle, Pa., a corporation of Pennsylvania Application January 21, 1950, Serial No. 139,917

5 Claims. (Cl. 310—8.2)

This invention relates to piezoelectric crystals and to mounting assemblies therefor.

Crystals for use in oscillator circuits and for frequency standards, selective filtering, and the like, demand in addition to particular axial cuts with respect to the crystalline structure, accurately defined peripheral contouring and close dimensional tolerances. The dimensioning and geometry of the finished crystal have been found to be particularly important factors in eliminating spurious, unwanted vibrations which tend to occur as an incident to the use of crystals in various radio frequency circuits.

It has been found that many of the undesirable vibrations which occur in crystals are out of phase echoes of wanted vibrations returned to the central portions of the crystal from the edges thereof. These spurious effects have heretofore been diminished by extending the crystal in length in the direction of the wanted vibrations for a distance governed by the frequency range within which the crystal is to operate and by the desired degree of freedom from the various spurious effects. Increasing the crystal size has the effect of attenuating the vibrations between the point of application of the original vibration-initiating impulse and the reflecting edges of the crystal. This attenuation of the vibrations within the crystal, in addition to decreasing edge-reflections, also necessarily reduces the tendency of the vibrations to emanate from the edges of the crystal, which vibrations may be returned to it in the form of echoes from the surfaces of its mounting assembly or housing to establish further spurious vibrations within the crystal. Inherent disadvantages of the above method for eliminating unwanted vibrations are increased crystal size and high manufacturing costs involved in predimensioning the crystals within close tolerances.

In accordance with this invention, a crystal is provided which has performance characteristics equivalent to or exceeding those of much larger crystals and which, being smaller than equivalent crystals, occupies a smaller space in the instrument utilizing the same.

Also, in accordance with the invention, a crystal is provided wherein precise predimensioning is made unnecessary, thereby materially decreasing the manufacturing cost of serviceable crystals.

Also, in accordance with this invention, a piezoelectric crystal assembly is provided whereby the activity of the crystal is so increased relatively to its size that smaller plating or electrode areas are required than heretofore, thereby reducing the shunt capacity of the unit, resulting in increased "stiffness" or a high LC ratio.

Another feature of the invention is an improved mounting particularly adapted for use with the improved crystal, in which one improvement supplements the other to produce a crystal assembly displaying excellent frequency stability under conditions of external vibration or shock to the assembly, and which results in an exceptionally high Q for a piezoelectric crystal unit of equivalent dimensions.

According to the invention, a crystal blank of any one of several axial cuts is formed into a disc shape and provided with a tapered margin preferably of convex contouring. The contoured margin serves to attenuate the crystal vibrations along any given axis before they reach the reflecting edge portions thereof, thereby to prevent internal reflections as well as the emanation of vibrations away from the crystal which may be reflected from the housing or mounting assembly to produce spurious echoes. Further, a mounting assembly is provided comprising supporting arms contained in the normal plane of the crystal and engaging the edges at diametrically opposed points. The size of the supporting arms may in this fashion be made comparatively small, thereby to reduce the reflecting surfaces in the vicinity of the crystal.

For a more complete understanding of the invention, reference may be had to the accompanying drawings in which.

Figures 1, 2, 3:
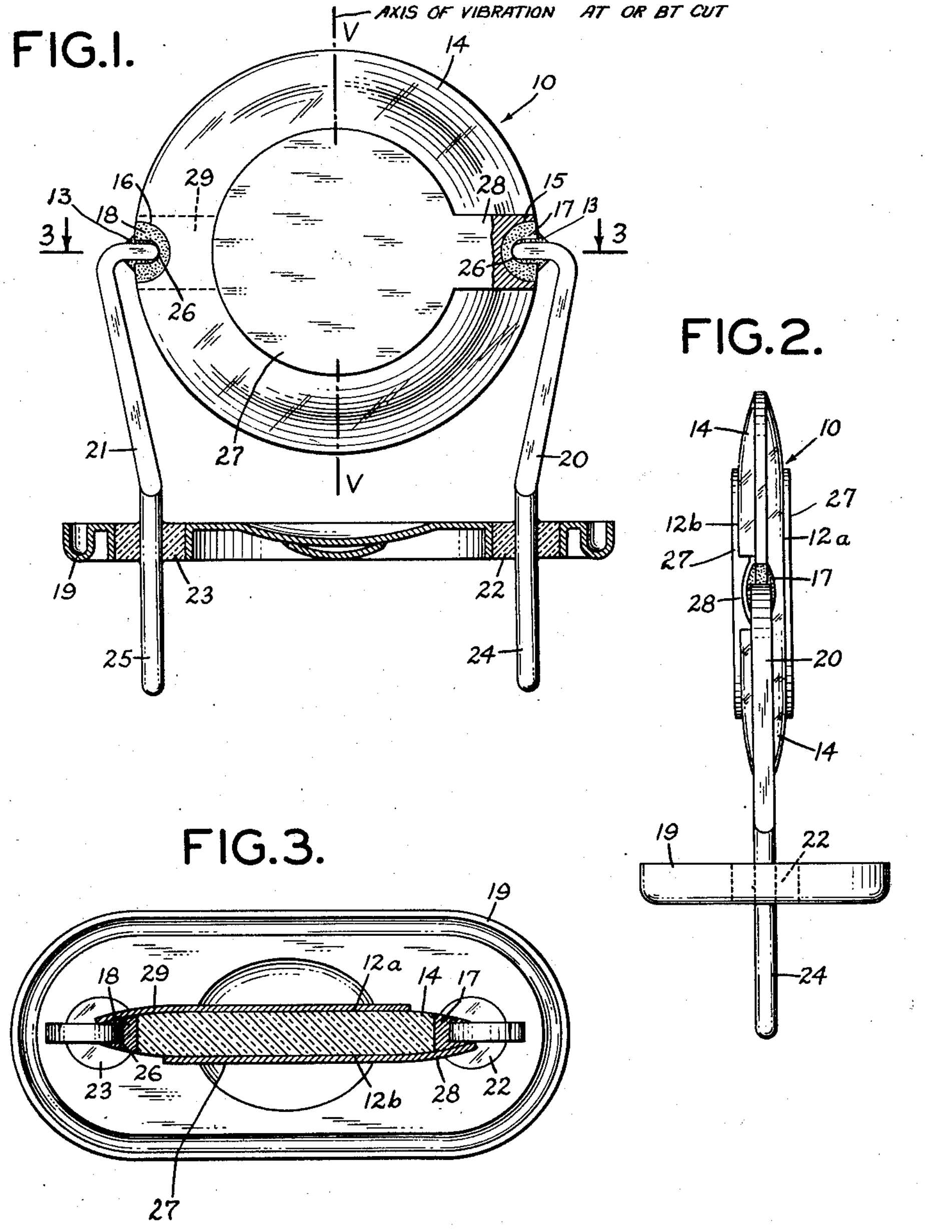
Figure 1 is a face view of the crystal and mounting of this invention, with the base element shown in cross section.
Figure 2 is an end view of the assembly shown in Figure 1.
Figure 3 is a cross-sectional view taken along the line 3—3 of Figure 1 and showing the precise contours of the flange portion of the crystal.

Referring to the drawings, numeral 10 designates the piezoelectric crystal comprised of a disc-shaped central portion having flat, parallel opposite faces 12*a* and 12*b* and a tapering annular flange portion 14. The crystal is preferably a standard, zero-temperature coefficient cut such as an AT or BT, the former being an arbitrary designation for a crystal cut along an axis at an angle of rotation of −49° to the X—X or electrical axis, and the latter being a cut along an axis rotateed 35° about the X—X axis.

The longitudinal axis of vibration of the crystal 10 is indicated by the line V—V of Figure 1, with the corresponding electrical axis being perpendicular to the plane of the drawing. The contour of the flange portion 14 is seen in Figures 2 and 3 to be tapered from a point of maximum thickness proximate to the central disc portion to a point of minimum thickness at the flange periphery. The function of this taper, which is most effective when curved to form a substantially convex cross section, is to greatly accelerate attenuation of vibrations moving toward the marginal areas of the crystal from the central point at which they are induced. The tapered edge, as formed according to the invention, thus tends to perform the function of a crystal of infinite length in so far as vibrations are prevented from reaching its edges to produce unwanted echoes.

The edge of the flange portion 14 is provided with diametrically opposed notches 15 and 16 disposed on an axis which is normal to the longitudinal axis of vibration V—V. Metallic inlays 17 and 18 are inserted in the notches 15 and 16, respectively, and may be formed by a silver paste baked therein, for example.

The mounting for the crystal 10 comprises a pressed or stamped metal base 19 having spaced openings in which are secured a pair of crystal-supporting and conducting arms 20 and 21 by means of dielectric beads 22 and 23 formed of suitable cement which also serves to insulate the arms 20 and 21 from the base 19. The depending lower ends 24 and 25 of the arms 20 and 21 are used as junction points or terminals for connecting the crystal in its circuit.

The upper ends of the arms 24 and 25 are curved inwardly and terminate in nose portions 26 which engage the respective inlays 17 and 18 to provide a good electrical contact and to hold the crystal 10 securely. If preferred, this mounting may be rendered stronger physically and more efficient electrically by the use of a solder joint 13 between the silver inlays and supporting arms, as shown.

It should be noted that the supporting arms 20 and 21 may be biased inwardly to press upon the crystal along an axis normal to its longitudinal axis of vibration V—V. This slight compression plus a soldered connection at the mounting joint has been found beneficial in effecting a firm mounting for the crystal, and in addition tends to damp unwanted, spurious vibrations in the crystal along an axis other than V—V. However, this compression should not exceed a few ounces, for excessive compression on the crystal in the direction of thrust of the supporting arms may have a significant damping effect upon the wanted vibrations along the axis V—V, thereby establishing a limiting factor in the magnitude of the inward thrust of the supporting arms. The thickness of the supporting arms should be several times the thickness of the wave length of the mechanical vibrations of the crystal to provide good stability for the unit.

It will be understood that the mounting unit described presents a minimum amount of reflecting surface to the edges and surfaces of the crystal, thus reducing further the possibility of spurious external vibrations being transmitted to the crystal from its mounting, as by echoes and the like.

Secured on each of the flat parallel faces 12 and 13 of the crystal 10 is a disc shaped metallic film 27 comprising an electrode which is applied by any suitable method, such as by vacuum plating or cathode sputtering. In Figs. 2 and 3 the thickness of the film 27 has been greatly exaggerated for the purposes of illustration. This film or plating 27 constitutes the electrodes by means of which the voltage impulses are impressed upon or taken from the crystal. To that end, narrow conducting paths 28 and 29, also composed of the metallic film, lead from the electrodes 27 to the inlays 17 and 18 respectively, the electrical path being completed by the supporting arms 20 and 21.

Inasmuch as dimensions of crystals are more or less pertinent to their response and activity, typical dimensional values for a crystal formed according to the invention and designed for operation in the range of one megacycle are included herewith, indicating the small size of the crystal of this invention relatively to those of conventional design. The overall diameter, including the contoured flange 14, is .548 inch, the central disc portion 11 being $\frac{5}{16}$ of an inch in diameter. The contoured flange portion is preferably formed by a 20 diopter lap which, with a crystal thickness of .070 inch gives a peripheral edge thickness of about .015 inch.

Crystals may be formed according to the invention having a frequency range between 700 kilocycles and 2 or 3 megacycles, with even higher frequencies up to 7 megacycles being attainable in certain circumstances. In general, the frequency characteristic is a function of the crystal thickness, being inversely proportional thereto. Likewise, the lap curvature may be varied as a function of frequency, this also being inversely proportional thereto.

An "AT cut" crystal having the above dimensions and novel marginal contouring, yields a temperature-frequency characteristic curve differing from that of a typical AT cut crystal, the range of operating temperatures being extended in both directions maintaining the same limits of accuracy. For example, a standard AT cut crystal has been found to have an approximate temperature range of −55° C. to +90° C. with frequency variations of approximately ±.005%. The new cut, on the other hand, has a temperature ambient of approximately −70° C. to +150° C. while maintaining the same standards of accuracy. It is also possible to operate the new crystal within more limited temperature ranges with greatly increased accuracy.

By contouring the flange 14 along a curved path rather than bevelling along a straight line, the angular shoulders conducive to the radiation of echo producing vibrations to the crystal housing are eliminated. As pointed out above, a primary function of the curved taper or chamber is to increase the vibration-damping effects of the flange, thereby accelerating attenuation of the vibrations before they reach the periphery of the crystal to be reflected therefrom. It is for this reason that a crystal formed according to this invention need not have a finite length or width, since the effect of the novel edge-beveling is to produce a crystal which functions as though it were of infinite size; i. e., no vibrations reach its edges.

It will be seen that the crystal and holder of this invention afford all the advantages of much larger crystals without many of the obvious disadvantages thereof, and that the novel shape of the crystal results in highly improved characteristics heretofore approached only by crystals manufactured at considerably greater cost.

Although a preferred embodiment of the invention has been illustrated and described herein, it is understood that the invention is not limited thereby, but is susceptible to changes in form and detail within the scope of the appended claims.

I claim:

1. A piezoelectric crystal assembly comprising a crystal including a disc-shaped inner portion having a pair of flat parallel faces across which voltage impulses may be impressed and generated and having a longitudinal axis of vibration and an annular vibration-damping flange portion surrounding the said inner portion and formed integrally therewith, said flange portion being tapered to diminish in thickness proceeding radially outwardly from the inner portion, said flange being provided on its edge with a pair of terminals disposed one at each extremity of the axis of the crystal which is normal to the longitudinal axis of vibration thereof, the said axes lying in a plane parallel to the parallel faces of the crystal and a pair of electrodes associated one with each parallel face of the crystal and connecting electrically to said terminals.

2. A piezoelectric crystal assembly comprising a crystal having a longitudinal axis of vibration and including a pair of flat parallel faces across which voltage impulses may be impressed and generated, a pair of crystal-supporting members engaging said crystal at its marginal edges, at opposite ends of an axis normal to the longitudinal axis of vibration of said crystal, said supporting members being adapted to bear inwardly against the crystal along the axis normal to the longitudinal axis of vibration of said crystal, the said axes lying in a plane parallel to the parallel faces of the crystal and a pair of electrodes for providing an electrical connection to the parallel faces of the crystal.

3. A piezoelectric crystal assembly comprising a disc-shaped crystal having a longitudinal axis of vibration and including a pair of flat parallel faces across which voltage impulses may be impressed and generated and a contoured annular flange portion integrally formed with said disc portion extending radially outwardly from the flat parallel faces of the crystal, said flange being contoured to present a cross section of diminishing thickness proceeding radially outwardly from the parallel faces, a pair of crystal-supporting arms engaging said flange portion at diametrically opposed points on the crystal along an axis normal to the longitudinal axis of vibration of the crystal, the said axes lying in a plane parallel to the parallel faces of the crystal and a pair of electrodes for providing an electrical connection between the parallel faces of the crystal and the said supporting arms.

4. A piezoelectric crystal assembly comprising a contoured crystal having a longitudinal axis of vibration and including a pair of flat parallel faces and an integrally formed annular flange portion laterally circumposing said flat face portion, said flange being contoured to diminish in thickness progressing radially outwardly to its peripheral margin, the said diminution occurring along a curvilinear path to develop a convex cross section in the marginal flange portion, a pair of diametrically opposed metallic contact inlays disposed along the axis which is normal to the longitudinal axis of vibration of said crystal, the said axes lying in a plane parallel to the parallel faces of the crystal, said inlays being disposed adjacent the periphery of said flange, conducting means for conveying current from opposing crystal faces to the respective marginal inlays, a pair of crystal-supporting and current-conveying arms affixed to said inlays pressing inwardly thereagainst to damp spurious vibrations in the crystal and leading away from said crystal in the plane containing the longitudinal axis of vibration of the crystal.

5. A piezoelectric crystal assembly comprising a contoured crystal having a longitudinal axis of vibration and including a pair of substantially circular flat parallel surfaces across which voltage impulses may be impressed and generated and an integrally formed annular flange portion extending laterally outwardly from said flat portion and contour to diminish in thickness progressing toward the flange periphery, the said diminution occurring along a curvilinear path to develop a substantially convex cross section in the flange portion, the flange portion being notched at opposite extremities of that axis which is perpendicular to the longitudinal axis of vibration of the crystal, the said axes lying in a plane parallel to the parallel faces of the crystal, metallic inlays disposed in said notches, a pair of crystal-supporting and current-carrying members affixed to said inlays, said supporting members extending away from the crystal in a plane substantially parallel to the plane of the crystal faces, a base element for anchoring said crystal-supporting members, and a pair of electrodes for conveying current between the crystal faces and the said inlays.

References Cited in the file of this patent

UNITED STATES PATENTS

| Number | Name | Date |
|---|---|---|
| 2,484,428 | Smith | Oct. 11, 1949 |
| 2,486,916 | Bottom | Nov. 1, 1949 |
| 2,503,429 | Ziegler | Apr. 11, 1950 |
| 2,505,121 | Knights | Apr. 25, 1950 |

OTHER REFERENCES

Ser. No. 364,006, Bechmann (A. P. C.), published May 18, 1943.